United States Patent
Song et al.

(10) Patent No.: US 11,029,873 B2
(45) Date of Patent: Jun. 8, 2021

(54) STORAGE DEVICE WITH EXPANDABLE LOGICAL ADDRESS SPACE AND OPERATING METHOD THEREOF

(71) Applicant: SAMSUNG ELECTRONICS CO., LTD., Suwon-si (KR)

(72) Inventors: Jaewon Song, Goyang-si (KR); Jaesub Kim, Seoul (KR); Sejeong Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/543,800

(22) Filed: Aug. 19, 2019

(65) Prior Publication Data

US 2020/0192592 A1 Jun. 18, 2020

(30) Foreign Application Priority Data

Dec. 12, 2018 (KR) .................. 10-2018-0160221

(51) Int. Cl.
*G06F 3/06* (2006.01)
*G06F 9/50* (2006.01)
*G06F 12/02* (2006.01)

(52) U.S. Cl.
CPC .......... *G06F 3/0644* (2013.01); *G06F 3/0607* (2013.01); *G06F 3/0679* (2013.01); *G06F 9/5077* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 9,003,071 B2 | 4/2015 | Liu | |
| 9,430,412 B2 | 8/2016 | Huang | |
| 9,727,570 B2 | 8/2017 | Post et al. | |
| 9,760,314 B2 | 9/2017 | Totolos et al. | |
| 9,785,355 B2 | 10/2017 | Huang | |
| 9,785,356 B2 | 10/2017 | Huang | |
| 10,095,413 B2 | 10/2018 | Kohara et al. | |
| 2011/0055297 A1* | 3/2011 | Maeda | G06F 3/0679 |
| | | | 707/824 |
| 2012/0239860 A1* | 9/2012 | Atkisson | G06F 12/0246 |
| | | | 711/103 |
| 2012/0254583 A1 | 10/2012 | Serizawa et al. | |
| 2014/0189203 A1* | 7/2014 | Suzuki | G06F 12/0868 |
| | | | 711/103 |

(Continued)

*Primary Examiner* — Edward J Dudek, Jr.
*Assistant Examiner* — Ralph A Verderamo, III
(74) *Attorney, Agent, or Firm* — F. Chau & Associates, LLC

(57) ABSTRACT

A method of operating a storage device with a memory includes partitioning an entire area of a first namespace into at least one area based on a reference size. The partitioning is performed in response to a namespace creating request from a host that includes size information corresponding to the entire area of the first namespace. The method further includes partitioning a logical address space of the memory into a plurality of segments, allocating a first segment of the plurality of segments to a first area of the at least one area, and storing mapping information of the first area and the first segment. A size of the logical address space is greater than a size of a physical storage space of the memory identified by the host.

15 Claims, 11 Drawing Sheets

(56) References Cited

U.S. PATENT DOCUMENTS

| | | |
|---|---|---|
| 2017/0242722 A1 | 8/2017 | Qiu et al. |
| 2018/0121344 A1 | 5/2018 | Seo et al. |
| 2018/0239697 A1 | 8/2018 | Huang et al. |
| 2018/0260334 A1* | 9/2018 | Asano .................. G06F 3/0679 |
| 2019/0146931 A1* | 5/2019 | Frolikov ............... G06F 3/0631 |
| | | 713/193 |

* cited by examiner

STORAGE DEVICE WITH EXPANDABLE LOGICAL ADDRESS SPACE AND OPERATING METHOD THEREOF

CROSS-REFERENCE TO RELATED APPLICATIONS

This application claims priority under 35 U.S.C. § 119 to Korean Patent Application No. 10-2018-0160221, filed on Dec. 12, 2018, in the Korean Intellectual Property Office, the disclosure of which is incorporated by reference herein in its entirety.

BACKGROUND

1. Field

One or more embodiments described herein relate to a semiconductor memory and a method for operating a semiconductor memory.

2. Description of the Related Art

A semiconductor memory may be classified as a volatile memory or nonvolatile memory. In a volatile memory, stored data is lost when power is turned off. In a nonvolatile memory, stored data is retained when power is turned off.

Some storage devices that include a memory support a namespace function. For example, in order to support the operations of a host, a storage device implemented with one physical device may be partitioned into a plurality of logical devices (e.g., namespaces). The host may then manage data based on the namespaces.

In some cases, a host may desire to create namespaces of different sizes. However, not all storage devices are able to support namespaces of different sizes. Moreover, the cost of a storage device that supports namespaces of different sizes is significant. The cost may be increased when the size of the memory of the storage device is increased, in order to allow for management of multiple namespaces.

SUMMARY

One or more embodiments of the inventive concept provide a storage device and an associated operating method which may support namespaces of various sizes, while reducing or minimizing an increase in costs.

In accordance with one or more embodiments, a method of operating a storage device with a memory includes partitioning an entire area of a first namespace into at least one area based on a reference size, the partitioning performed in response to a namespace creating request from a host, the namespace creating request including size information of the first namespace that corresponds to the entire area of the first namespace; partitioning a logical address space of the memory into a plurality of segments; allocating a first segment of the plurality of segments to a first area of the at least one area; and storing mapping information of the first area and the first segment, wherein a size of the logical address space is greater than a size of a physical storage space of the memory identified by the host.

In accordance with one or more embodiments, a method of operating a storage device including a memory includes partitioning an entire area of a first namespace into at least one area based on a reference size, the partitioning performed in response to a namespace creating request from a host, the namespace creating request including size information of the first namespace that corresponds to the entire area of the first namespace, when a first area of the at least one area is smaller than the reference size, expanding a logical address space of the memory; allocating a first logical address space of the expanded logical address space to the first area; and storing mapping information of the first area and the allocated first logical address space.

In accordance with one or more embodiments, a storage device includes a memory; an address mapping manager configured to manage a logical address space partitioned into a plurality of segments based on a reference size; a namespace manager configured to partition an entire area of a first namespace into at least one area based on the reference size, the namespace manager configured to partition the entire area of the first namespace in response to a namespace creating request from a host, the namespace creating request including size information corresponding to the entire area of the first namespace, the namespace manager further configured to allocate a first area of the at least one area to a first segment of the plurality of segments; and a segment mapping table configured to store mapping information of the first area and the first segment, wherein the logical address space is greater than a physical storage space of the memory identified by the host.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept may be described in detail and clearly to such an extent that an ordinary one in the art easily implements the inventive concept.

Figure 1:
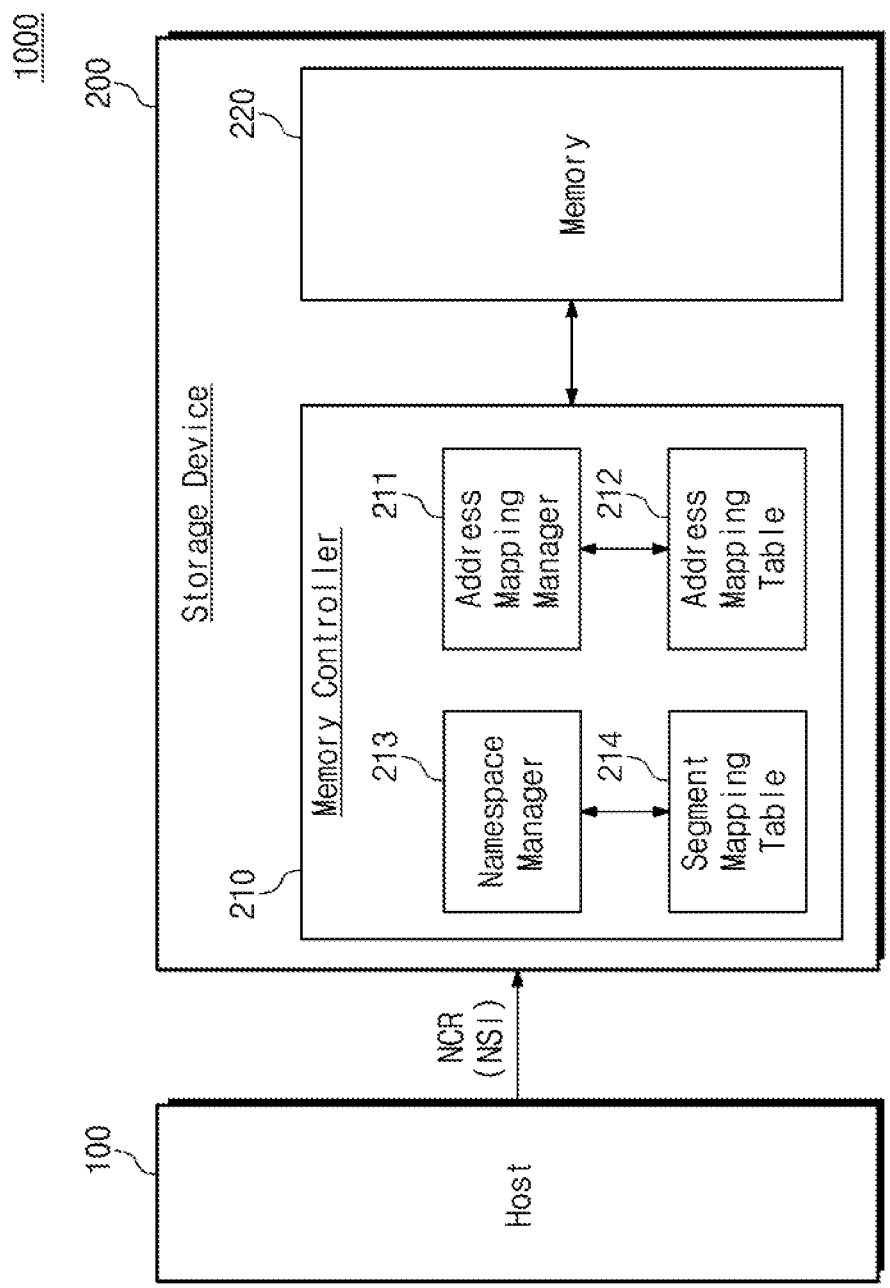
FIG. 1 illustrates an embodiment of a storage system.

FIG. 1 illustrates an embodiment of a storage system 1000 which may include a host 100 and a storage device 200. For example, the storage system 1000 may, for example, a desktop computer, a laptop computer, a tablet computer, a smartphone, a wearable device, an electric vehicle, a server system, or any kind of electronic device or system using the storage device 200.

The host 100 may allow the storage device 200 to store data generated within the host 100 or received from a device outside of the host 100. The host 100 may store data generated as an execution result of an application in the storage device 200.

Under control of the host 100, the storage device 200 may store data provided from the host 100 or may output the stored data. For example, the storage device 200 may communicate with the host 100 in compliance with a nonvolatile memory express (NVMe) communication protocol. In another embodiment, the storage device 200 may communicate with the host 100 in compliance with a different communication protocol.

The storage device 200 may include a memory controller 210 and a memory 220. The memory controller 210 may control operation of the memory 220 and may store data from the host 100 in the memory 220 based on a request of the host 100. The memory controller 210 may provide data output from the memory 220 to the host 100 based on a request of the host 100.

The memory 220 may operate under control of the memory controller 210. Examples of the memory 220 include a flash memory, a volatile memory device, and a nonvolatile memory device. Examples of a volatile memory device may include random access memory (RAM) such as a static random access memory (SRAM), a dynamic RAM (DRAM), and a synchronous DRAM (SDRAM). Examples of a nonvolatile memory device include a read only memory (ROM), a programmable ROM (PROM), an electrically programmable ROM (EPROM), an electrically erasable and programmable ROM (EEPROM), a phase-change RAM (PRAM), a magnetic RAM (MRAM), a resistive RAM (RRAM), and a ferroelectric RAM (FRAM).

The memory controller 210 may manage addresses of the memory 220 for the purpose of efficiently performing operations of storing and outputting data. To manage the addresses of the memory 220, the memory controller 210 may include an address mapping manager 211 and an address mapping table 212.

The address mapping manager 211 may allocate a physical address of the memory 220 to an address (e.g., a logical address) of the memory 220 managed by the host 100. The address mapping manager 211 may store and manage mapping information of logical addresses and physical addresses in the address mapping table 212. For example, in the case where a logical address of the memory 220 and data are provided from the host 100 for the purpose of storing data, the address mapping manager 211 may allocate a physical address of the memory 220 (at which the data is stored) to the logical address. The address mapping manager 211 may store mapping information of the logical address and the allocated physical address in the address mapping table 212.

The address mapping table 212 may store a logical address and a physical address corresponding to the logical address. One or more logical addresses stored in the address mapping table 212 may correspond to a logical address space. In at least one embodiment, a logical address space may correspond to a logical storage space indicated by a logical address of the memory 220 managed by the storage device 200.

The memory controller 210 may support a namespace function. In one embodiment, a namespace may correspond to a space of the memory 220 capable of being partitioned into (or composed of) logical blocks. For example, a namespace of size "n" may be a set of logical blocks having logical block addresses (LBAs) from "0" to (n−1). In the case where the memory controller 210 supports the namespace function, the host 100 may create a plurality of namespaces based on the storage device 200 being one physical device. In this case, each namespace may be recognized by the host 100 as one logical device which may store data.

The memory controller 210 may include a namespace manager 213 and a segment mapping table 214 for the purpose of supporting a namespace function. The namespace manager 213 may allocate a logical address space to create a namespace. For example, the namespace manager 213 may allocate a partial logical address space of the entire logical address space to create a namespace. The partial logical address space may correspond to one or more logical addresses of the address mapping table 212. The namespace manager 213 may manage a namespace using the allocated logical address space.

The namespace manager 213 may partition the entire logical address space into a plurality of segments. The namespace manager 213 may allocate one or more of the partitioned segments to a namespace. The namespace manager 213 may store mapping information of a namespace and an allocated segment in the segment mapping table 214. For example, the namespace manager 213 may store segment information of a logical address allocated to a namespace in the segment mapping table 214.

The segment mapping table 214 may store a namespace and a segment corresponding to the namespace. For example, in the case where first to third segments are allocated to a first namespace, the segment mapping table 214 may store mapping information of the first namespace and the first to third segments.

As illustrated in FIG. 1, the host 100 may provide a namespace creating request NCR to the storage device 200. Namespace size information NSI may be included in the namespace creating request NCR. The namespace size information NSI may be information indicating a size of a namespace to be created. For example, the namespace size information NSI may indicate 40 GB. In this case, the namespace creating request NCR may indicate that a namespace of 40 GB is to be created.

The namespace manager 213 may create a namespace based on the namespace creating request NCR. The namespace manager 213 may allocate a segment based on the namespace size information NSI. For example, in the case where a namespace is greater than a reference size, the namespace manager 213 may partition the namespace into a plurality of areas based on the reference size and may allocate a segment to each area. For example, the namespace manager 213 may allocate two or more segments to a namespace. In the case where a namespace is not greater than the reference size, the namespace manager 213 may classify a namespace as one area based on the reference size and may allocate a segment to one area. In one embodiment, the namespace manager 213 may allocate one segment to a namespace. The reference size may be information set in advance to the memory controller 210 as a memory size corresponding to one segment.

The namespace manager 213 may store mapping information of a namespace and an allocated segment in the segment mapping table 214. The namespace manager 213 may manage the mapping information for each namespace in order to support a plurality of namespaces. For example, the namespace manager 213 may create namespaces in the order of namespace creating request NCR, and may create namespace identification information to identify a specific namespace from the plurality of namespaces. The namespace identification information generated from the namespace manager 213 may be provided to the host 100. As such, the host 100 may use a namespace based on the provided namespace identification information. For example, the host 100 may provide namespace identification information to the storage device 200 in order to access a specific namespace. In this case, the namespace manager 213 may determine a segment (e.g., an allocated logical address space) allocated to the specific namespace using the segment mapping table 214.

As described above, in the case where the storage device 200 supports the namespace function, the host 100 may provide the namespace creating request NCR to the storage device 200. As such, the namespace manager 213 may store a logical address space of a segment unit to a namespace and may store allocation information in the segment mapping table 214. After allocating a logical address space to a namespace, the storage device 200 may provide a namespace creating completion signal to the host 100. For example, the namespace creating completion signal may include namespace identification information.

Figure 2:
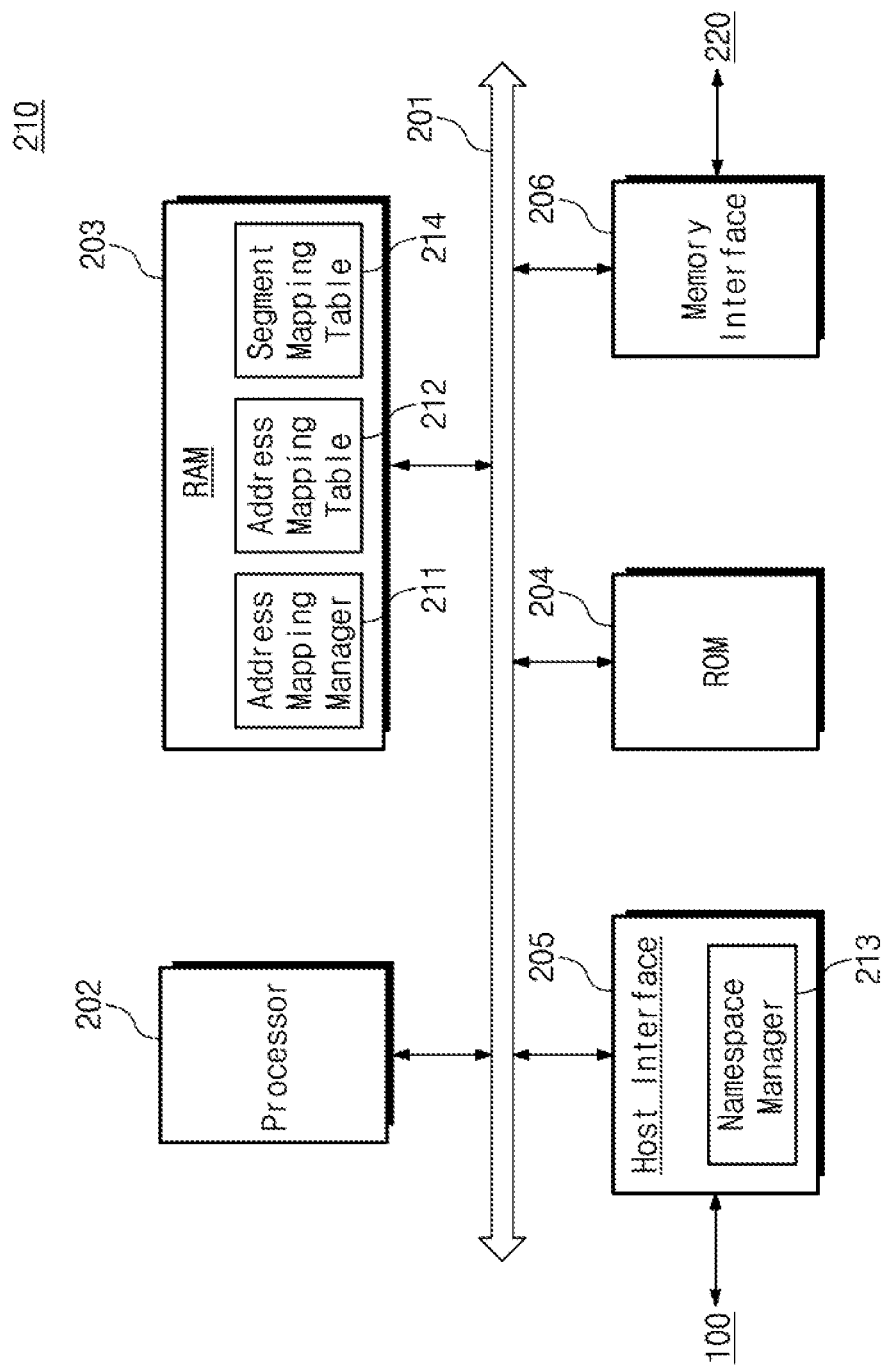
FIG. 2 illustrates an embodiment of a memory controller.

FIG. 2 illustrates an embodiment of the memory controller 210 of FIG. 1. Referring to FIG. 2, the memory controller 210 may include a bus 201, a processor 202, a RAM 203, a ROM 204, a host interface 205, and a memory interface 206. The RAM 203 may include the address mapping manager 211, the address mapping table 212, and the segment mapping table 214. The host interface 205 may include the namespace manager 213. In one embodiment, operations of the address mapping manager 211, the address mapping table 212, and the segment mapping table 214 of FIG. 2 may be substantially identical to the operations described with reference to FIG. 1.

The bus 201 is configured to provide a channel between the components of the memory controller 210. The processor 202 may control overall operations of the memory controller 210.

The RAM 203 may be used as a buffer memory, a cache memory, or a working memory of the memory controller 210. For example, the RAM 203 may be implemented with at least one of a DRAM, an SRAM, a tightly coupled memory (TCM), a PRAM, and a flash memory. The address mapping manager 211 may be software or firmware loaded into the RAM 203 and may be driven by the processor 202. For example, the address mapping manager 211 may be implemented by a flash translation layer (FTL), which performs various management operations between the host 100 and the memory 220.

The address mapping table 212 may be stored, for example, in a DRAM or a flash memory. The segment mapping table 214 may be stored, for example, in an SRAM or a TCM for a high-speed access. The SRAM or the TCM may have greater restrictions on costs and a size than the DRAM or the flash memory. As such, increasing the size of the segment mapping table 214 may be more expensive than increasing in the size of the address mapping table 212. Operations of the memory controller 210 for reducing or minimizing the size increase of the segment mapping table 214 will be more fully described with reference to FIGS. 3 to 8.

The ROM 204 may store a variety of information to support operation of the memory controller 210. In one embodiment, the information may include instructions in the form of firmware. The host interface 205 may serve as an interface between the host 100 and the memory controller 210. For example, the host interface 205 may communicate with the host 100 using an interface protocol. Examples of the interface protocol include an NVMe interface protocol, universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), or universal flash storage (UFS).

The namespace manager 213 may include software or firmware driven in the host interface 205. The namespace manager 213 may allocate a logical address space to a namespace (e.g., as described with reference to FIG. 1) based on the namespace creating request NCR provided from the host 100 through the host interface 205. In accordance with the embodiment illustrated in FIG. 2, the namespace manager 213 may be included in the host interface 205. In one embodiment, the namespace manager 213 may be included in the RAM 203 or the ROM 204.

The memory controller 210 may communicate with the memory 220 through the memory interface 206. For example, the memory controller 210 may provide data to be stored to the memory 220 through the memory interface 206 or may receive data stored in the memory 220.

The components of the memory controller 210 described above may be implemented, for example, in the form of software, hardware, or a combination thereof. In an embodiment, the software may include machine code, firmware, an embedded code, and/or application software. The hardware may include an electrical circuit, an electronic circuit, a processor, an integrated circuit, one or more integrated circuit cores, a microelectromechanical system (MEMS), or a combination thereof.

For convenience of description, operations associated with a namespace will be described on the basis of the storage device 200. Operations to be described below may be appropriately performed by various components included in the storage device 200, for example, as described with reference to FIGS. 1 and 2.

Figure 3:
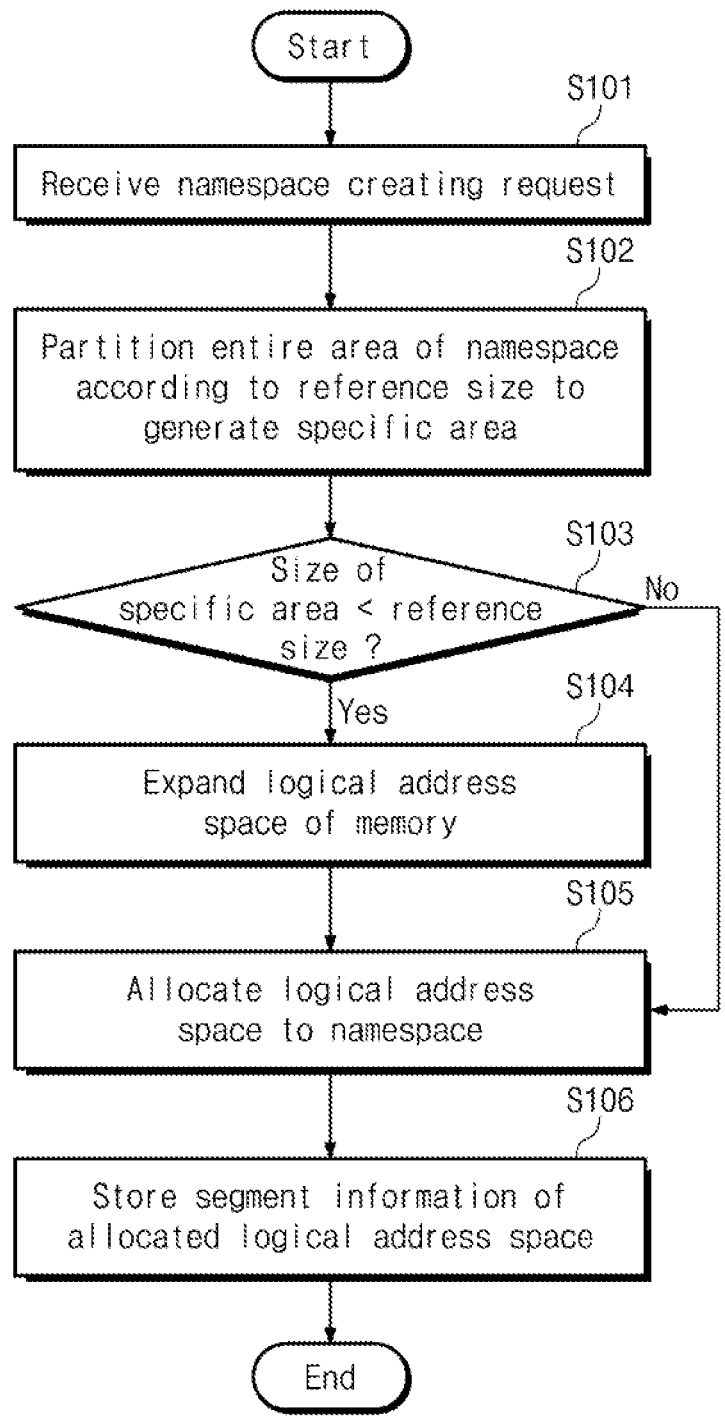
FIG. 3 illustrates an embodiment of a method of creating a namespace.

FIG. 3 illustrates an embodiment of a method of creating a namespace, which method may be partially or entirely performed by storage device 200. Referring to FIGS. 1 and 3, in operation S101, the storage device 200 may receive the namespace creating request NCR from the host 100. In operation S102, in response to the namespace creating request NCR, the storage device 200 may partition the entire area of a namespace based on the reference size and may generate a specific area. The specific area may be an area of the namespace that remains after partitioning the namespace based on the reference size. When the namespace is greater than the reference size, the specific area may be a partial area of the entire area of the namespace. In this case, the specific area may be not greater than the reference size. For example, in the case where the reference size is 16 GB and the namespace is 40 GB, the specific area may be a partial area of 8 GB. When the namespace is less than the reference size, the specific area may be identical to the entire area of the namespace. For example, in the case where the reference size is 16 GB and the namespace is 256 MB, the specific area may be the entire area of 256 MB.

In operation S103, the storage device 200 may determine whether the specific area is less than the reference size. When the specific area is less than the reference size, in operation S104, the storage device 200 may expand a logical address space of the memory 220. The address mapping manager 211 may increase the size of the address mapping table 212 to expand a logical address space. For example, the address mapping manager 211 may additionally secure space of a memory (e.g., RAM 203 of FIG. 2) for storing the address mapping table 212. When the specific area is not less than the reference size (e.g., when the specific area is identical to the reference size), the storage device 200 may not expand a logical address space of the memory 220.

Before expansion, the logical address space may be identical to the physical storage space of the memory 220 identified by the host 100. For example, in the case where the physical storage space of the memory 220 identified by the host 100 is 128 GB, the logical address space may be 128 GB. The expanded logical address space may be greater than the physical storage space of the memory 220 identified by the host 100. For example, in the case where the physical storage space of the memory 220 identified by the host 100 is 128 GB, the expanded logical address space may be greater than 128 GB.

In operation S105, the storage device 200 may allocate a logical address space to a namespace. In the case where the logical address space of the memory 220 is expanded in operation S104, the storage device 200 may allocate a logical address space to a namespace based on the expanded logical address space. In this case, a logical address space corresponding to one segment may be allocated to each of areas of a namespace partitioned based on the reference size. One segment may indicate a logical address space of the reference size, e.g., a logical address space of the reference size may be allocated to the specific area. In one embodiment, in the case where the specific area is less than the reference size, a logical address space of the same size as the specific area may be allocated to the specific area.

In the case where the specific area is identical to the reference size and thus a logical address space is not expanded, the storage device 200 may allocate a logical address space to a namespace based on the logical address space that is not expanded. In this case, a logical address space of the reference size corresponding to one segment may be allocated to each area of a namespace.

In operation S106, the storage device 200 may store segment information of the allocated logical address space. The storage device 200 may store segment information corresponding to each area of the namespace in the segment mapping table 214.

Figure 4:
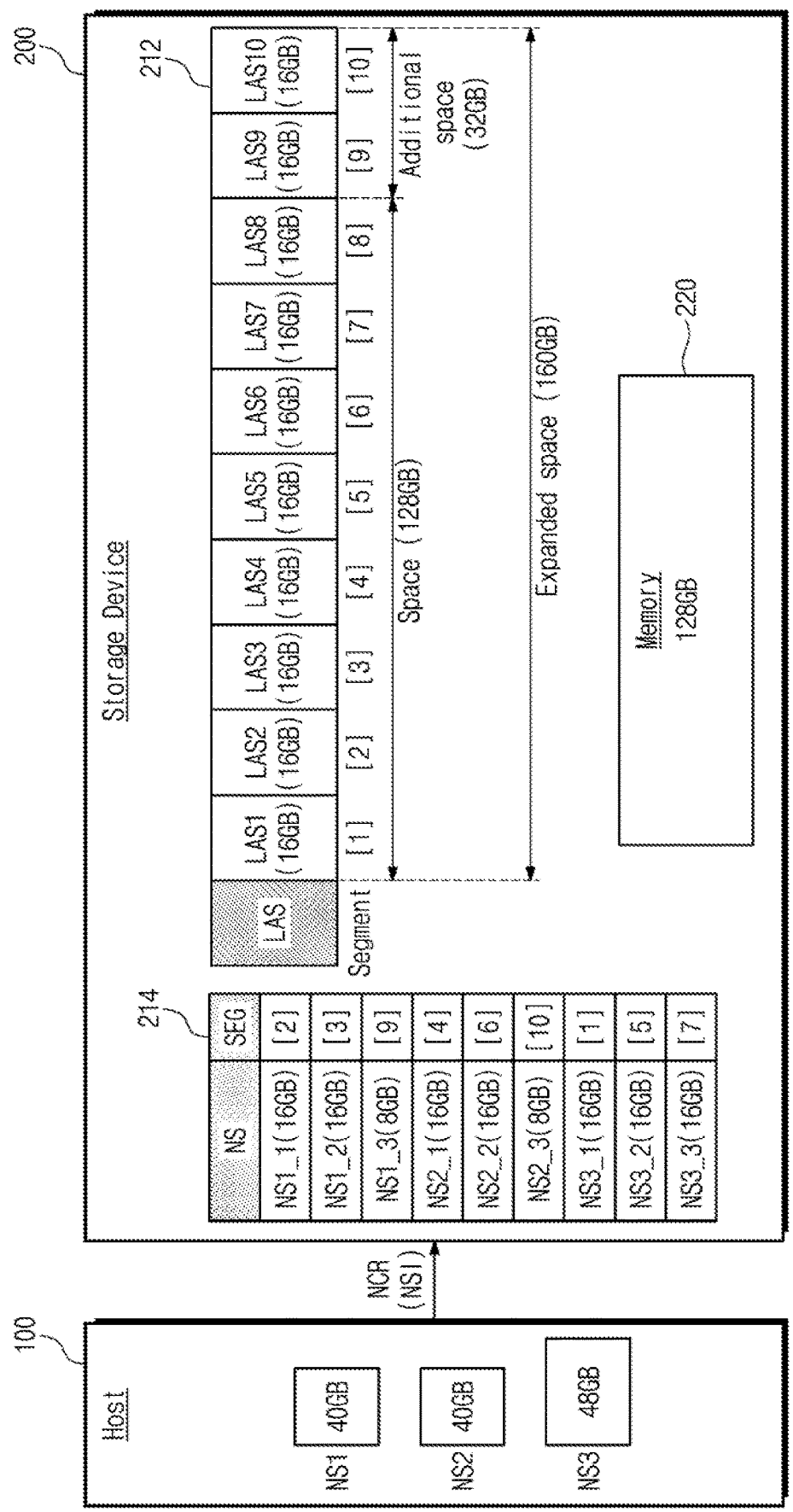
FIG. 4 illustrates an example for describing operation of the method.

FIG. 4 illustrates an example for describing the operation of the method of FIG. 3. Referring to FIG. 4, the host 100 may request the storage device 200 to create multiple namespaces. As illustrated in FIG. 4, the host 100 may request creation of a first namespace NS1 of 40 GB, a second namespace NS2 of 40 GB, and a third namespace NS3 of 48 GB, based on a physical storage space of 128 GB of the memory 220 identified by the host 100. The host 100 may provide the namespace creating request NCR to the storage device 200 for each namespace. For example, to request creation of the first namespace NS1, the host 100 may provide a first namespace creating request NCR1 including namespace size information NS1 indicating 40 GB to the storage device 200. To request creation of the second namespace NS2, the host 100 may provide a second namespace creating request NCR2 including namespace size information NS1 indicating 40 GB to the storage device 200. To request creation of the third namespace NS3, the host 100 may provide a third namespace creating request NCR3 including namespace size information NS1 indicating 48 GB to the storage device 200.

The storage device 200 may create the first to third namespaces NS1 to NS3 based on the first to third namespace creating requests NCR1 to NCR3. To create the first namespace NS1, the storage device 200 may partition the entire area of the first namespace NS1 into first to third areas NS1_1 to NS1_3 based on a reference size (in one example, it may be assumed that the reference size is 16 GB). Because the entire area of the first namespace NS1 is 40 GB and the reference size is 16 GB, the first area NS1_1 of 16 GB, the second area NS1_2 of 16 GB, and the third area NS1_3 of 8 GB may be created as a result of the partition. The third area NS1_3 may be a specific area which remains after partitioning the first namespace NS1 based on the reference size.

The storage device 200 may determine whether the third area NS1_3 is smaller than the reference size. Because the third area NS1_3 of 8 GB is smaller than the reference size of 16 GB, the storage device 200 may expand a logical address space LAS. Before the logical address space LAS is expanded, the logical address space LAS may be 128 GB which is identical to the size of the memory 220. The logical address space LAS of 128 GB is partitioned into first to eighth segments SEG[1] to SEG[8], each of which may correspond to the logical address space LAS of 16 GB. For example, the first logical address space LAS1 may correspond to the first segment SEG[1]. The storage device 200 may additionally secure a ninth logical address space LAS9 of 16 GB, which is the reference size. The ninth logical address space LAS9 may correspond to a ninth segment SEG[9]. As such, the logical address space LAS of 128 GB may be expanded to 144 GB, and the size of the address mapping table 212 may be increased.

The storage device 200 may allocate the logical address space LAS to the first namespace NS1 based on the expanded logical address space LAS. The storage device 200 may allocate a second logical address space LAS2 to the first area NS1_1, may allocate a third logical address space LAS3 to the second area NS1_2, and may allocate the ninth logical address space LAS9 to the third area NS1_3. The storage device 200 may allocate the added ninth logical address space LAS9 to the third area NS1_3. In one embodiment, the storage device 200 may sequentially allocate the first to third logical address spaces LAS1 to LAS3 to the first to third areas NS1_1 to NS1_3.

The storage device 200 may store mapping information of the first to third areas NS1_1 to NS1_3 and the allocated logical address spaces LAS2, LAS3, and LAS9 in the segment mapping table 214. For example, the storage device 200 may store segment information (e.g., the second segment SEG[2]) of the second logical address space LAS2 in the segment mapping table 214 so as to correspond to the first area NS1_1.

Likewise, to create the second namespace NS2, the storage device 200 may partition the entire area of the second namespace NS2 into first to third areas NS2_1 to NS2_3 based on the reference size. Because the entire area of the second namespace NS2 is 40 GB and the reference size is 16 GB, the first area NS2_1 of 16 GB, the second area NS2_2 of 16 GB, and the third area NS2_3 of 8 GB may be created as a result of the partition. The third area NS2_3 may be a specific area which remains after partitioning the second namespace NS2 based on the reference size.

Because the third area NS2_3 of 8 GB is smaller than the reference size of 16 GB, the storage device 200 may additionally expand the logical address space LAS that is expanded according to the creation of the first namespace NS1. Before additionally expanding the logical address space LAS, the expanded logical address space LAS may be 144 GB. The storage device 200 may additionally secure a tenth logical address space LAS10 of 16 GB which is the reference size. The tenth logical address space LAS10 may correspond to a tenth segment SEG[10]. As such, the logical address space LAS of 144 GB may be expanded to 160 GB, and the size of the address mapping table 212 may be increased.

The storage device 200 may allocate the logical address space LAS to the second namespace NS2 based on the additionally expanded logical address space LAS. The storage device 200 may allocate the remaining logical address space LAS other than the logical address space LAS allocated to the first namespace NS1. The storage device 200 may allocate a fourth logical address space LAS4 to the first area NS2_1, may allocate a sixth logical address space LAS6 to the second area NS2_2, and may allocate the tenth logical address space LAS10 to the third area NS2_3. The storage device 200 may store mapping information of the first to third areas NS21 to NS2_3 and the allocated logical address spaces LAS4, LAS6, and LAS10 in the segment mapping table 214.

To create the third namespace NS3, the storage device 200 may partition the entire area of the third namespace NS3 into first to third areas NS3_1 to NS3_3 based on the reference size. Because the entire area of the third namespace NS3 is 48 GB and the reference size is 16 GB, the first area NS3_1 of 16 GB, the second area NS3_2 of 16 GB, and the third area NS3_3 of 16 GB may be created as a result of the partition. The third area NS3_3 may be a specific area which remains after partitioning the third namespace NS3 based on the reference size.

Because the third area NS3_3 of 16 GB is identical to the reference size of 16 GB, the storage device 200 may not additionally expand the logical address space LAS. The storage device 200 may allocate the logical address space LAS to the third namespace NS3 based on the logical address space LAS expanded according to the creation of the second namespace NS2. The storage device 200 may allocate the remaining logical address space LAS other than the logical address space LAS allocated to the first namespace NS1 and the second namespace NS2. The storage device 200 may allocate the first logical address space LAS1 to the first area NS3_1, may allocate a fifth logical address space LAS5 to the second area NS3_2, and may allocate a seventh logical address space LAS7 to the third area NS3_3. The storage device 200 may store mapping information of the first to third areas NS3_1 to NS3_3 and the allocated logical address spaces LAS1, LAS5, and LAS7 in the segment mapping table 214.

As illustrated in FIG. 4, in the case of using the expanded logical address space LAS, the logical address space LAS may exist which is not allocated to the first to third namespaces NS1 to NS3. For example, an eighth logical address space LAS8 of 16 GB, the ninth logical address space LAS9 of 8 GB, and the tenth logical address space LAS10 of 8 GB may not be allocated. A physical address may not be allocated to a logical address that corresponds to the logical address space LAS that is not allocated.

As described above, according to an embodiment of the inventive concept, the storage device 200 may support namespaces of various sizes by expanding the logical address space LAS. In this case, the host 100 may create namespaces of various sizes. Accordingly, the host 100 may efficiently use the memory 220 based on a namespace.

The memory 220 illustrated in FIG. 4 may indicate a physical storage space of the memory 220 identified by the host 100. The memory 220 may further include an additional physical storage space not identified by the host 100, e.g., the memory 220 may include an additional storage space in addition to a storage space of 128 GB.

Before expansion, the logical address space LAS may be identical to a physical storage space of the memory 220 identified by the host 100. For example, the logical address space LAS may be 128 GB. As described above, in the case where the logical address space LAS is expanded, the expanded logical address space LAS may be greater than 128 GB.

In the case where the logical address space LAS is not expanded, the logical address space LAS may be partitioned into eight segments. In this case, as illustrated in FIG. 4, because the first to third namespaces NS1 to NS3 are partitioned into nine areas, the logical address space LAS which may be allocated to the first to third namespaces NS1 to NS3 may be insufficient. In this case, the host 100 may only create namespaces corresponding to a multiple of the reference size. For example, in some cases, the size of a namespace which the host 100 may create may be limited.

In the case where the reference size is set to be small (e.g., less than a certain size) for the purpose of supporting namespaces of various sizes, a namespace may be partitioned into more areas. In this case, the size of the segment mapping table 214 storing segment information corresponding to each area may be increased. As described, for example, with reference to FIG. 2, because the segment mapping table 214 is stored in an SRAM or a TCM accessible at high speed, costs for the storage device 200 may increase considerably when the size of the segment mapping table 214 is increased.

In contrast, in the case of the storage device 200 according to an embodiment of the inventive concept, because the reference size is set such that the size of the segment mapping table 214 is optimized, an increase in costs for the storage device 200 may be reduced or minimized.

Figure 5:
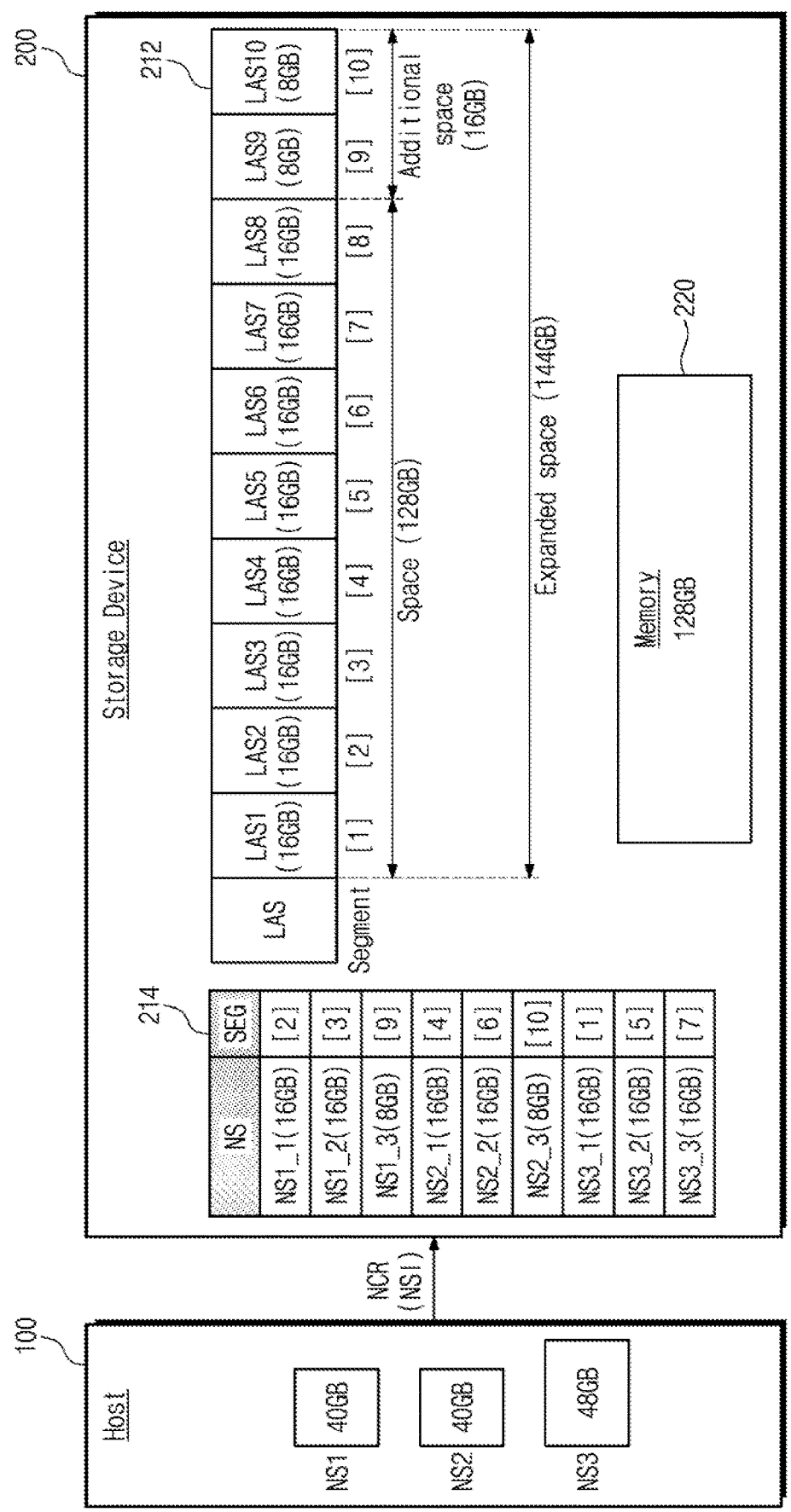
FIG. 5 illustrates another example for describing operation of the method.

FIG. 5 illustrates another example for describing the operation of the method of FIG. 3. Operation of the storage device 200 of FIG. 5 may be similar to operation of the storage device 200 described with reference to FIG. 4, but with some differences.

Referring to FIG. 5, the host 100 may request the storage device 200 to create the first to third namespaces NS1 to NS3. To create the first namespace NS1, the storage device 200 may partition the first namespace NS1 into the first area NS1_1 of 16 GB, the second area NS1_2 of 16 GB, and the third area NS1_3 of 8 GB. Because the third area NS1_3 of 8 GB is less than the reference size of 16 GB, the storage device 200 may expand the logical address space LAS. The storage device 200 may additionally secure the ninth logical address space LAS9 corresponding to the size of the third area NS1_3, e.g., the ninth logical address space LAS9 of 8 GB may be additionally secured. As such, the logical address space LAS of 128 GB may be expanded to 136 GB, and the size of the address mapping table 212 may be increased.

The storage device 200 may allocate the logical address space LAS to the first namespace NS1 based on the expanded logical address space LAS. In this case, because the added ninth logical address space LAS9 corresponds to the size of the third area NS1_3, the storage device 200 may allocate the added ninth logical address space LAS9 to the third area NS1_3. The storage device 200 may store mapping information of the first to third areas NS1_1 to NS1_3 and the allocated logical address spaces LAS2, LAS3, and LAS9 in the segment mapping table 214.

To create the second namespace NS2, the storage device 200 may partition the second namespace NS2 into the first area NS2_1 of 16 GB, the second area NS2_2 of 16 GB, and the third area NS2_3 of 8 GB. Because the third area NS2_3 of 8 GB is less than the reference size of 16 GB, the storage device 200 may additionally expand the logical address space LAS. The storage device 200 may additionally secure the tenth logical address space LAS10 corresponding to the size of the third area NS2_3, e.g., the tenth logical address space LAS10 of 8 GB may be additionally secured. As such, the logical address space LAS of 136 GB may be expanded to 144 GB, and the size of the address mapping table 212 may be increased.

The storage device 200 may allocate the logical address space LAS to the second namespace NS2 based on the additionally expanded logical address space LAS. In this case, because the added tenth logical address space LAS10 corresponds to the size of the third area NS2_3, the storage device 200 may allocate the added tenth logical address space LAS10 to the third area NS2_3. The storage device 200 may store mapping information of the first to third areas NS2_1 to NS2_3 and the allocated logical address spaces LAS4, LAS6, and LAS10 in the segment mapping table 214.

Afterwards, the storage device 200 may create the third namespace NS3 as described with reference to FIG. 4. For example, the storage device 200 may allocate the logical address space LAS to the third namespace NS3 based on the additionally expanded logical address space LAS and may store mapping information about allocated logical address spaces LAS1, LAS5, and LAS7 in the segment mapping table 214.

As illustrated in FIG. 5, in the case where a specific area of a namespace is less than the reference size, the storage device 200 may additionally secure the logical address space LAS to be allocated to the specific area. Unlike the description given with reference to FIG. 4, the storage device 200 may expand the logical address space LAS based on a size of the specific area. As such, the storage device 200 may reduce or minimize an increase in the size of the address mapping table 212 due to the expansion of the logical address space LAS.

Figure 6:
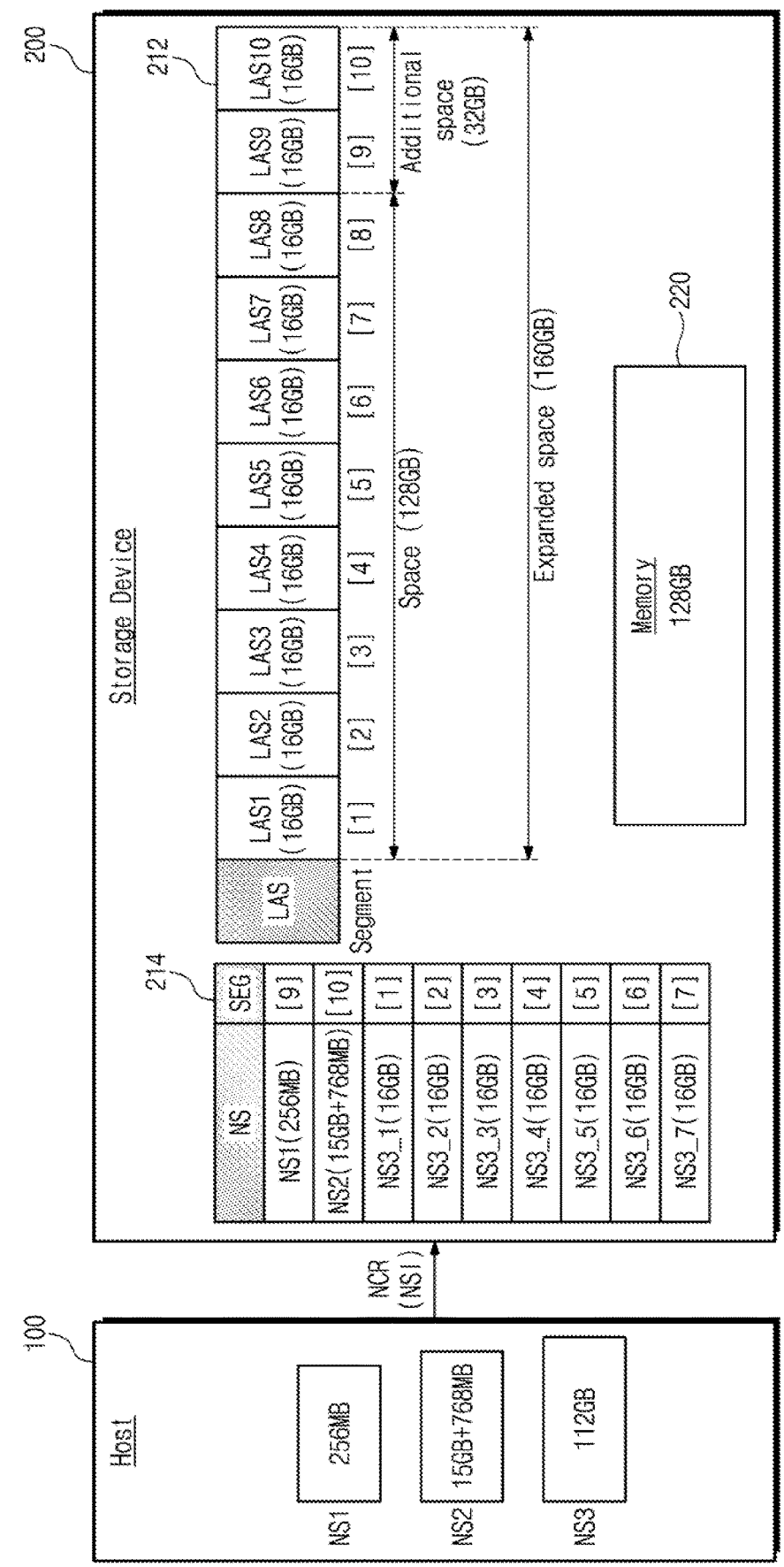
FIG. 6 illustrates another example for describing operation of the method.

FIG. 6 illustrates another example for describing the operation of the method of FIG. 3. Operation of the storage device 200 of FIG. 6 may be similar to operation of the storage device 200 described with reference to FIG. 4, but with some differences.

Referring to FIG. 6, the host 100 may request the storage device 200 to create the first to third namespaces NS1 to NS3. As illustrated in FIG. 6, the host 100 may request the creation of a first namespace NS1 of 256 MB, a second namespace NS2 of "15 GB+768 MB", and a third namespace NS3 of 112 GB, based the memory 220 of 128 GB. To create the first namespace NS1, the storage device 200 may partition the first namespace NS1 based on the reference size of 16 GB. Since the first namespace NS1 is smaller than the reference size, one area created as a result of the partition may be identical to the first namespace NS1, e.g., the entire area of the first namespace NS1 may be determined as the specific area.

Because the first area NS1 of 256 MB is less than the reference size of 16 GB, the storage device 200 may expand the logical address space LAS. The storage device 200 may additionally secure the ninth logical address space LAS9 of the reference size, e.g., the ninth logical address space LAS9 of 16 GB may be additionally secured. As such, the logical address space LAS of 128 GB may be expanded to 144 GB, and the size of the address mapping table 212 may be increased.

The storage device 200 may allocate the logical address space LAS to the first namespace NS1 based on the expanded logical address space LAS. The storage device 200 may allocate the ninth logical address space LAS9 to the first namespace NS1. The storage device 200 may store mapping information of the first namespace NS1 and the allocated logical address space LAS9 in the segment mapping table 214.

To create the second namespace NS2, the storage device 200 may partition the second namespace NS2 based on the reference size of 16 GB. Since the second namespace NS2 is smaller than the reference size, one area created as a result of the partition may be identical to the second namespace NS2. For example, the entire area of the second namespace NS2 may be determined as the specific area.

Because the second area NS2 of "15 GB+768 MB" is smaller than the reference size of 16 GB, the storage device 200 may additionally expand the logical address space LAS. The storage device 200 may additionally secure the tenth logical address space LAS10 of the reference size, e.g., the tenth logical address space LAS10 of 16 GB may be additionally secured. As such, the expanded logical address space LAS of 144 GB may be expanded to 160 GB, and the size of the address mapping table 212 may be increased.

The storage device 200 may allocate the logical address space LAS to the second namespace NS2 based on the additionally expanded logical address space LAS. The storage device 200 may allocate the tenth logical address space LAS10 to the second namespace NS2. The storage device 200 may store mapping information of the second namespace NS2 and the allocated logical address space LAS10 in the segment mapping table 214.

To create the third namespace NS3, the storage device 200 may partition the entire area of the third namespace NS3 into first to seventh areas NS3_1 to NS3_7 based on the reference size. Because the entire area of the third namespace NS3 is 112 GB and the reference size is 16 GB, seven areas NS3_1 to NS3_7 may be created as a result of the partition. The seventh area NS3_7 may be a specific area which remains after partitioning the third namespace NS3 based on the reference size.

Because the third area NS3_7 of 16 GB is identical to the reference size of 16 GB, the storage device 200 may not additionally expand the logical address space LAS. The storage device 200 may allocate the logical address space LAS to the third namespace NS3 based on the logical address space LAS expanded according to the creation of the second namespace NS2. For example, the storage device 200 may sequentially allocate first to seventh logical address spaces LAS1 to LAS7 to the first to seventh areas NS3_1 to NS3_7. The storage device 200 may store mapping information of the first to seventh areas NS3_1 to NS3_7 and the allocated logical address spaces LAS1 to LAS7 in the segment mapping table 214.

As illustrated in FIG. 6, according to an embodiment of the inventive concept, the storage device 200 may support a namespace having a size smaller than the reference size. Even though the a namespace is created to have a size smaller than the reference size, the size of the segment mapping table 214 may not be increased. Accordingly, an increase in costs for the storage device 200 may be reduced or minimized.

Figure 7:
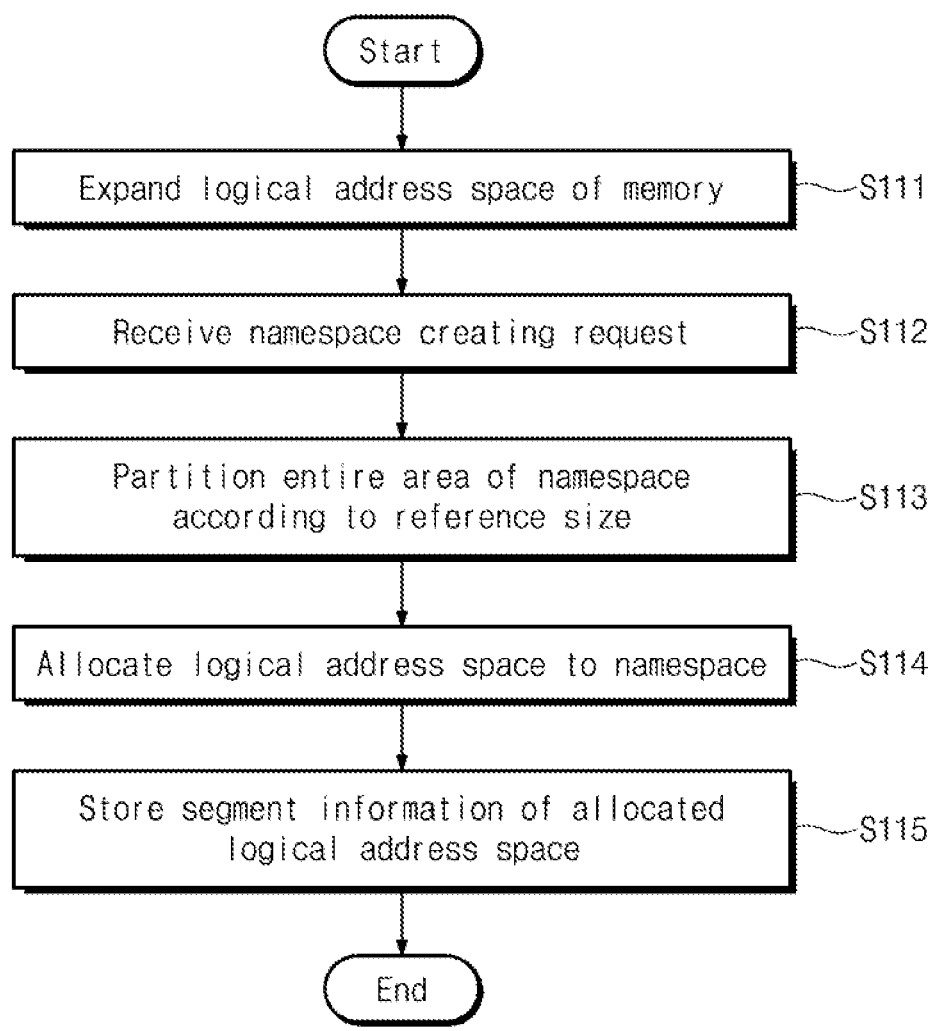
FIG. 7 illustrates another embodiment of a method of creating a namespace.

FIG. 7 illustrates another embodiment of a method for creating a namespace by the storage device 200 of FIG. 1. Referring to FIGS. 1 and 7, in operation S111, the storage device 200 may expand a logical address space of the memory 220. For example, the storage device 200 may expand the logical address space of the memory 220 in an initialization operation. The storage device 200 may expand the logical address space based on the number of supportable namespaces.

In at least one embodiment, the number of supportable namespaces may correspond to the maximum number of namespaces that are capable of being created in the storage device 200, and may be set in advance to the storage device 200. For example, in the case where the storage device 200 supports three multiple namespaces, a logical address space corresponding to the three segments may be additionally secured. In this case, each segment may correspond to the reference size. In one embodiment, in the case where the storage device 200 supports three multiple namespaces, the storage device 200 may additionally secure a logical address space corresponding to two segments.

In operation S112, the storage device 200 may receive the namespace creating request NCR from the host 100. In operation S113, the storage device 200 may partition the entire area of a namespace based on the reference size in response to the namespace creating request NCR. In the case where the namespace is greater than the reference size, a plurality of areas may be created as a result of the partition. In the case where a size of the namespace is less than the reference size, one area may be created as the partition result and may be identical to the entire area of the namespace.

In operation S114, the storage device 200 may allocate the logical address space to the namespace. The storage device 200 may allocate the logical address space to the namespace based on the logical address space expanded in operation S111. A logical address space corresponding to one segment may be allocated to each of the areas of the namespace partitioned based on the reference size. In this case, because the logical address space is allocated based on the logical address space expanded in operation S111, the logical address space may not be insufficient. That is, a logical address space corresponding to one segment may be allocated to an area (e.g., a specific area) of a namespace smaller than the reference size.

In operation S115, the storage device 200 may store segment information of the allocated logical address space. The storage device 200 may store segment information corresponding to each area of the namespace in the segment mapping table 214.

Figure 8:
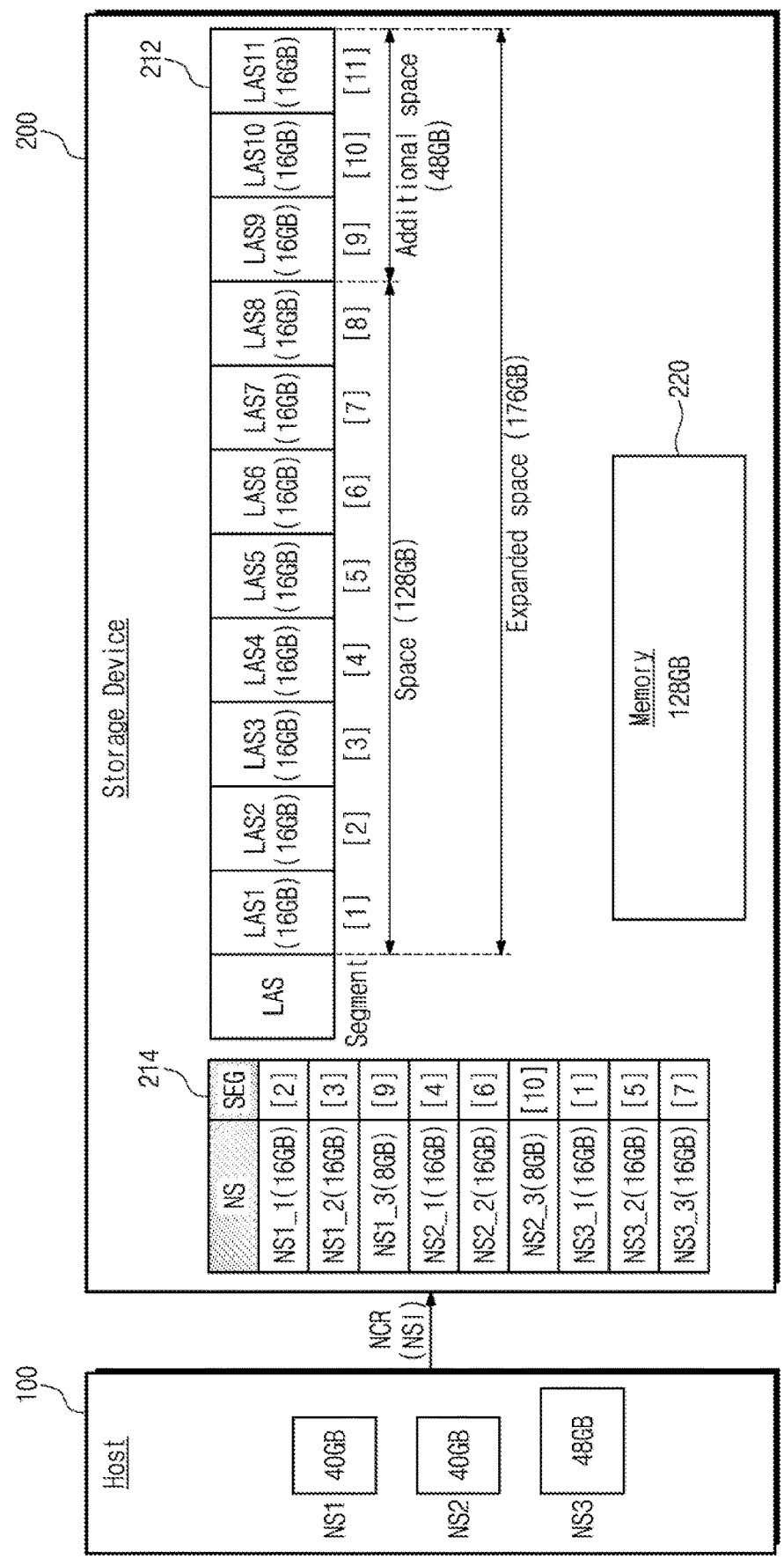
FIG. 8 illustrates an example for describing operation of the method of FIG. 7.

FIG. 8 illustrates an example for describing an operation of FIG. 7. For illustrative purposes, in the following description it may be assumed that the number of namespaces which the storage device 200 supports is "3, but this number of namespaces may be different in another embodiment.

Referring to FIG. 8, the storage device 200 may expand the logical address space LAS based on the number of supportable namespaces. Because the number of supportable namespaces is 3 (in this example), the storage device 200 may expand logical address spaces LAS9 to LAS11 corresponding to three segments. Each segment may correspond to the reference size of 16 GB. As such, the logical address space LAS of 128 GB may be expanded to the logical address space LAS of 176 GB.

Afterwards, the host 100 may request the storage device 200 to create multiple namespaces. As illustrated in FIG. 8, the host 100 may request creation of the first namespace NS1 of 40 GB, the second namespace NS2 of 40 GB, and the third namespace NS3 of 48 GB, based the memory 220 of 128 GB.

To create the first namespace NS1, the storage device 200 may partition the first namespace NS1 into the first to third areas NS1_1 to NS1_3 based on the reference size. The storage device 200 may allocate the logical address space LAS to the first to third areas NS1_1 to NS1_3 based on the logical address space LAS expanded in advance. The storage device 200 may allocate the logical address space LAS in compliance with various allocation rules. For example, as illustrated in FIG. 8, the storage device 200 may allocate the second logical address space LAS2 to the first area NS1_1, may allocate the third logical address space LAS3 to the second area NS1_2, and may allocate the ninth logical address space LAS9 to the third area NS1_3. The storage device 200 may store mapping information of the first to third areas NS1_1 to NS1_3 and the allocated logical address spaces LAS2, LAS3, and LAS9 in the segment mapping table 214.

To create the second namespace NS2, the storage device 200 may partition the second namespace NS2 into the first to third areas NS2_1 to NS2_3 based on the reference size. The storage device 200 may allocate the logical address space LAS to the first to third areas NS2_1 to NS2_3 based on the logical address space LAS expanded in advance. The storage device 200 may allocate the remaining logical address space LAS other than the logical address space LAS allocated to the first namespace NS1. For example, as illustrated in FIG. 8, the storage device 200 may allocate the fourth logical address space LAS4 to the first area NS2_1, may allocate the sixth logical address space LAS6 to the second area NS2_2, and may allocate the tenth logical address space LAS10 to the third area NS2_3. The storage device 200 may store mapping information of the first to third areas NS2_1 to NS2_3 and the allocated logical address spaces LAS4, LAS6, and LAS10 in the segment mapping table 214.

To create the third namespace NS3, the storage device 200 may partition the third namespace NS3 into the first to third areas NS3_1 to NS3_3 based on the reference size. The storage device 200 may allocate the logical address space LAS to the first to third areas NS3_1 to NS3_3 based on the logical address space LAS expanded in advance. The storage device 200 may allocate the remaining logical address space LAS other than the logical address space LAS allocated to the first namespace NS1 and the second namespace NS2. For example, as illustrated in FIG. 8, the storage device 200 may allocate the first logical address space LAS1 to the first area NS3_1, may allocate the fifth logical address space LAS5 to the second area NS3_2, and may allocate the seventh logical address space LAS7 to the third area NS3_3. The storage device 200 may store mapping information of the first to third areas NS3_1 to NS3_3 and the allocated logical address spaces LAS1, LAS5, and LAS7 in the segment mapping table 214.

As described above, according to an embodiment of the inventive concept, the storage device 200 may expand in advance the logical address space LAS based on the number of supportable namespaces. In the case of expanding a logical address space in advance, operations of comparing the size of a specific area of a namespace (described with reference to FIG. 3) with the reference size and expanding the logical address space LAS based on a comparison result may be omitted. Thus, compared with the operation of FIG. 3, operation of the storage device 200 may be simplified and the complexity of software or hardware of the storage device 200 may be reduced.

Figure 9:
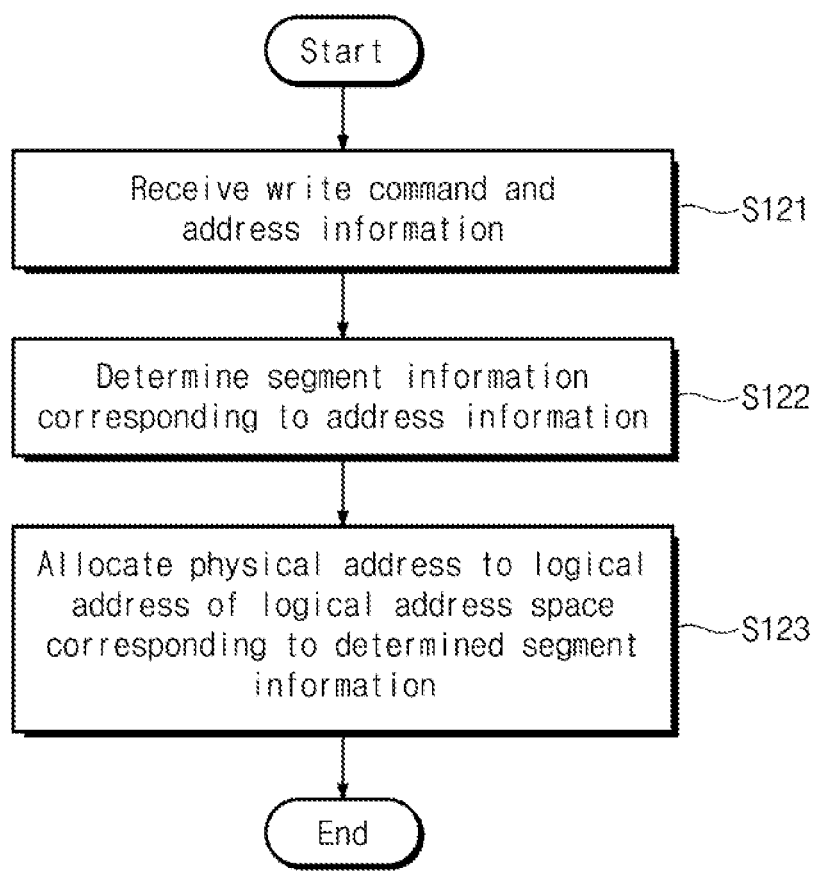
FIG. 9 illustrates an embodiment of a method of performing a write operation in a storage device.

FIG. 9 illustrates an embodiment of a write operation for the storage device 200 of FIG. 1. The storage device 200 may perform a write operation based on a namespace created according to an embodiment of the inventive concept.

Referring to FIGS. 1 and 9, in operation S121, the storage device 200 may receive a write command including address information from the host 100. In addition, the storage device 200 may receive data to be written from the host 100. Address information may include namespace identification information and a logical address of a namespace in which data will be written.

In operation S122, the storage device 200 may determine segment information corresponding to the address information. The determined segment information may indicate a logical address space in which data will be written. The storage device 200 may determine the segment information based on the namespace identification information and the logical address. The storage device 200 may determine the segment information through the segment mapping table 214.

In operation S123, the storage device 200 may allocate a physical address to a logical address space corresponding to the determined segment information. The storage device 200 may store mapping information of the logical address and the allocated physical address in the address mapping table 212. Data may be stored in the allocated physical address.

Figure 10:
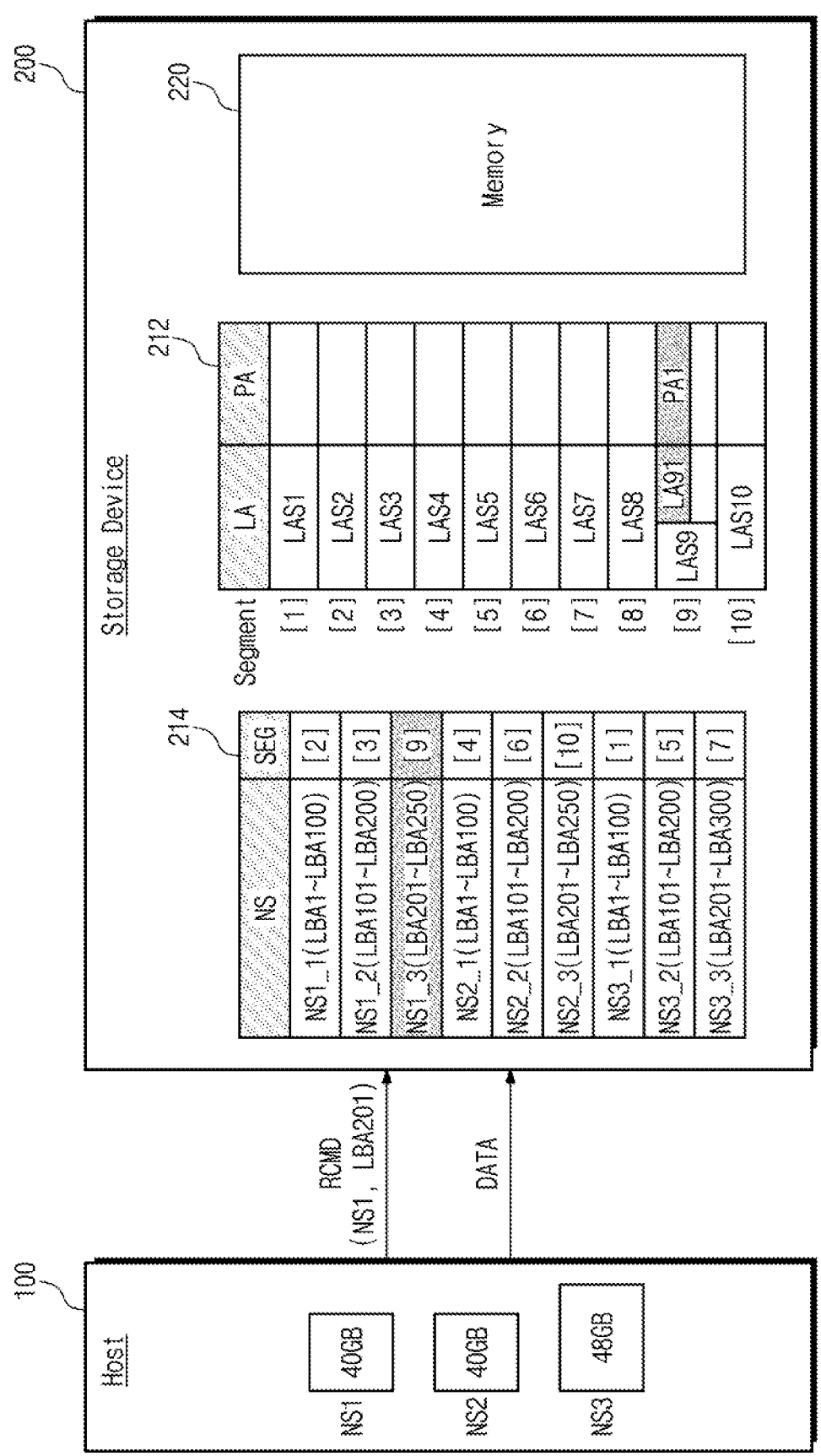
FIG. 10 illustrates an example for describing the method of FIG. 9.

FIG. 10 illustrates an example for describing an operation of FIG. 9. Referring to FIG. 10, the storage device 200 may include the address mapping table 212 and the segment mapping table 214. The size of the address mapping table 212 may be in an increased state according to creation of the first to third namespaces NS1 to NS3, and the segment mapping table 214 may store segment information corresponding to each namespace.

The host 100 may perform a write operation based on the first to third namespaces NS1 to NS3. The host 100 may provide a write command RCMD and data "DATA" to the storage device 200. As illustrated in FIG. 10, the write command RCMD may include namespace identification information NS1 indicating the first namespace NS1 and a logical block address LBA201 as address information. For example, the host 100 may provide the storage device 200 with the write command RCMD for storing the data "DATA" at the logical block address LBA201 of the first namespace NS1.

The storage device 200 may determine segment information corresponding to the address information based on the write command RCMD. The storage device 200 may determine the segment information corresponding to the logical block address LBA201 of the first namespace NS1 through the segment mapping table 214. The logical block address LBA201 of the first namespace NS1 may be included in the third area NS1_3. As such, the storage device 200 may determine the ninth segment SEG[9] as the segment information.

The storage device 200 may allocate a physical address PA to the ninth logical address space LAS9 corresponding to the determined ninth segment SEG[9]. The ninth logical address space LAS9 may include a plurality of logical addresses LA. For example, each logical address LA may be a logical page number LPN managed in the unit of a page. The storage device 200 may allocate a physical address PA1 to a logical address LA91 of the ninth logical address space LAS9 corresponding to the logical block address LBA201. The storage device 200 may store mapping information of the logical address LA91 and the allocated physical address PA1 in the address mapping table 212. The data "DATA" may be stored at the allocated physical address PA1.

As described above, the storage device 200 may partition the logical address space LAS into a plurality of segments and may manage a namespace. As such, in the case where a write operation associated with a specific namespace is requested, the storage device 200 may store the data "DATA" and may quickly allocate the physical address PA (at which the data "DATA" are stored) to the logical address LA. Like the write operation, the storage device 200 may perform a read operation and a delete operation as in the above-described manner. Thus, the storage device 200 may support various operations associated with a namespace based on the logical address space LAS partitioned into segments.

Figure 11:
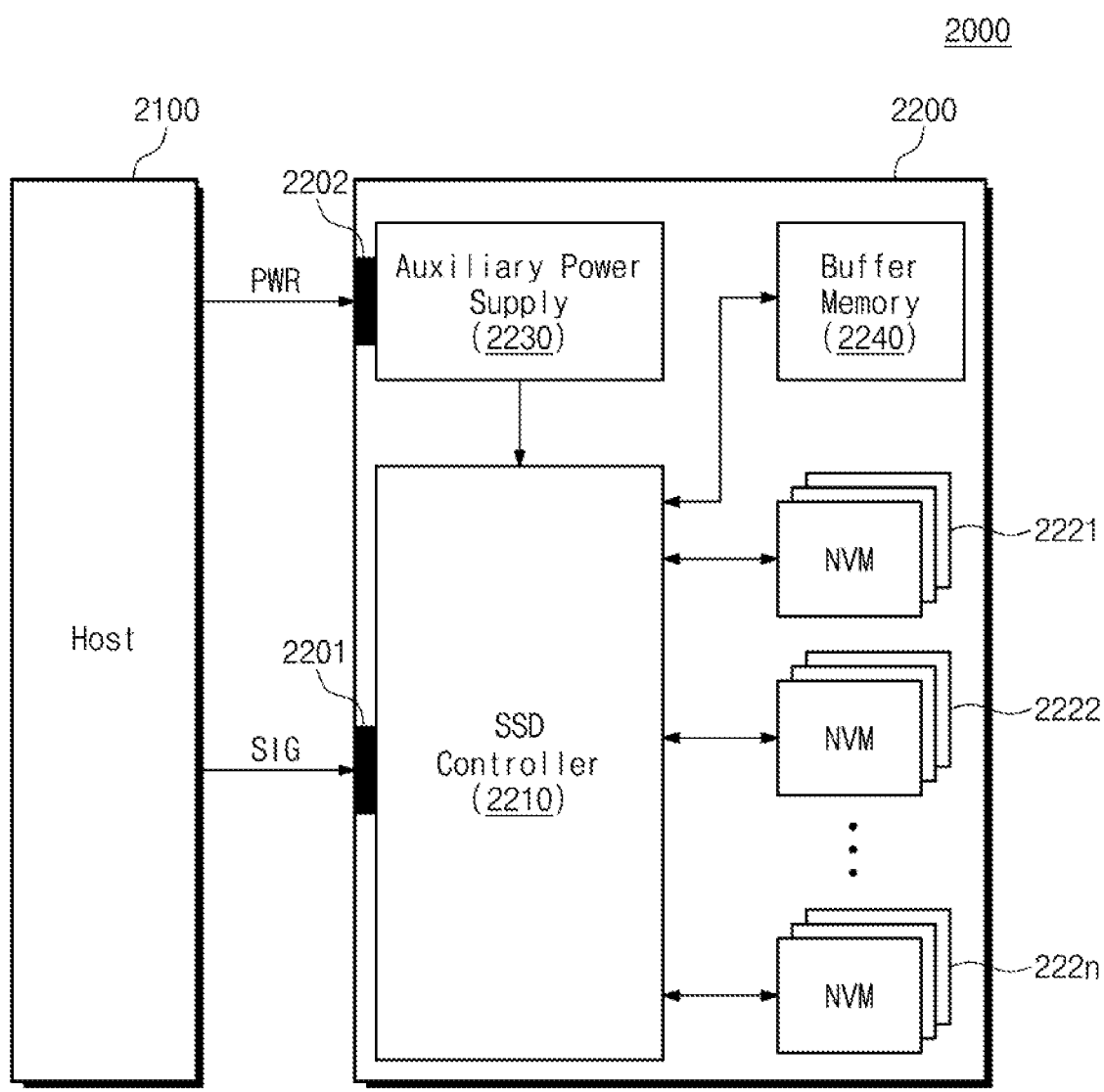
FIG. 11 illustrates an embodiment of an SSD system.

FIG. 11 illustrates an SSD system 2000 according to an embodiment of the inventive concept. Referring to FIG. 11, the SSD system 2000 may include a host 2100 and an SSD 2200.

The SSD 2200 may exchange signals SIG with the host 2100 through a signal connector 2201 and may receive power PWR through a power connector 2202. The SSD 2200 may include an SSD controller 2210, a plurality of flash memories 2221 to 222n, an auxiliary power supply 2230, and a buffer memory 2240. Each of the flash memories 2221 to 222n may be implemented with a separate die or a separate chip.

The SSD controller 2210 may control the flash memories 2221 to 222n based on the signals SIG received from the host 2100. The flash memories 2221 to 222n may operate under control of the SSD controller 2210. The SSD controller 2210 may include the function of the memory controller 210, for example, as described with reference to FIGS. 1 to 10. In one embodiment, the SSD controller 2210 may create a namespace based on a namespace creating request signal SIG of the host 2100. To support namespaces of various sizes, the SSD controller 2210 may expand a logical address space of the flash memories 2221 to 222n and may allocate a logical address space to a namespace based on the expanded logical address space.

The auxiliary power supply 2230 may be connected with the host 2100 through the power connector 2202. The auxiliary power supply 2230 may be charged by power PWR from the host 2100. In the case where the power PWR is not smoothly supplied from the host 2100, the auxiliary power supply 2230 may provide the power of the SSD 2200.

The buffer memory 2240 may operate as a buffer memory of the SSD 2200. For example, the buffer memory 2240 may temporarily store data from the host 2100 or data from the flash memories 2221 to 222n or may temporarily store metadata of the flash memories 2221 to 222n. The address mapping table 212 described with reference to FIGS. 1 to 10 may be stored in an internal memory of the SSD controller 2210. In one embodiment, the address mapping table 212 may be stored in the buffer memory 2240 outside the SSD controller 2210.

In accordance with one or more of the aforementioned embodiments of the inventive concept, a storage device may support namespaces of various sizes and may allow a host to efficiently use a memory space. Also, according to the inventive concept, an increase in costs for the storage device may be reduced or minimized by optimizing the capacity of a memory used to manage a namespace.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

In accordance with one embodiment, a non-transitory computer-readable medium stores the code or instructions that perform operations of the embodiments described above. The computer-readable medium may be a volatile or non-volatile memory or other storage device, which may be removably or fixedly coupled to the computer, processor, controller, or other signal processing device which is to execute the code or instructions for performing the method embodiments described herein.

The processors, controllers, managers, interfaces, and other signal generating and signal processing features of the embodiments disclosed herein may be implemented in logic which, for example, may include hardware, software, or both. When implemented at least partially in hardware, the processors, controllers, managers, interfaces, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, processors, controllers, managers, interfaces, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method of operating a storage device including a memory, the method comprising:
partitioning an entire area of a first namespace into at least one area based on a reference size, the partitioning performed in response to a namespace creating request from a host, the namespace creating request including size information of the first namespace that corresponds to the entire area of the first namespace;
partitioning a logical address space of the memory having a size of a physical storage space of the memory into a plurality of segments each having the reference size;
expanding the logical address space to include an additional segment having the reference size when a first area of the at least one area is smaller than the reference size;
allocating the additional segment of the expanded logical address space to the first area; and
storing mapping information mapping the first area to the additional segment.

2. The method of claim 1, wherein the logical address space includes:
a first logical address space having the size of the physical storage space; and
a second logical address space of a size based on a number of supportable namespaces.

3. The method of claim 1, wherein, when a size of the first namespace is greater than the reference size, the first area is a partial area of the entire area of the first namespace.

4. The method of claim 1, wherein: when a size of the first namespace is not greater than the reference size, the first area is identical to the entire area of the first namespace.

5. The method of claim 1, wherein the mapping information is stored in a tightly coupled memory (TCM) or a static random access memory (SRAM).

6. A method of operating a storage device including a memory, the method comprising:
partitioning an entire area of a first namespace into at least one area based on a reference size, the partitioning performed in response to a namespace creating request from a host, the namespace creating request including size information of the first namespace that corresponds to the entire area of the first namespace;
partitioning a logical address space of the memory having a size of a physical storage space of the memory into a plurality of segments each having the reference size;
expanding the logical address space to include an additional segment having the reference size for each of supported namespaces; and
allocating one of the additional segments of the expanded logical address space to a first area of the at least one area when the first area is smaller than the reference size.

7. The method of claim 6, wherein, when a size of the first namespace is greater than the reference size, the first area is a partial area of the entire area of the first namespace.

8. The method of claim 6, wherein, when a size of the first namespace is not greater than the reference size, the first area is identical to the entire area of the first namespace.

9. The method of claim 6, wherein the expanded logical address space is greater than a physical storage space of the memory identified by the host.

10. A storage device, comprising:
a memory;
an address mapping manager configured to manage a logical address space of a memory having a size of a physical storage space of the memory partitioned into a plurality of segments each having a reference size;
a namespace manager configured to partition an entire area of a first namespace into at least one area based on the reference size, the namespace manager configured to partition the entire area of the first namespace in response to a namespace creating request from a host, the namespace creating request including size information corresponding to the entire area of the first namespace, the namespace manager further configured to allocate a first area of the at least one area to a first segment of the plurality of segments; and
a segment mapping table configured to store mapping information of the first area and the first segment,
wherein the address mapping manager expands the logic address space to include an additional segment having the reference size when a first area of the at least one area is smaller than the reference size and allocates the additional segment of the expanded logical address space to the first area.

11. The storage device of claim 10, wherein the logical address space includes:
  a first logical address space having the size of the physical storage space; and
  a second logical address space a size based on a number of supportable namespaces.

12. The storage device of claim 10, further comprising:
  an address mapping table configured to store logical addresses corresponding to the logical address space and physical addresses corresponding to the logical addresses.

13. The storage device of claim 12, wherein a size of the logical address space corresponds to a size of the address mapping table.

14. The storage device of claim 10, wherein the segment mapping table is stored in a tightly coupled memory (TCM) or a static random access memory (SRAM) of the storage device.

15. The storage device of claim 10, wherein the storage device and the host communicate with each other based on a non-volatile memory express (NVMe) communication protocol.

* * * * *